US010678211B2

(12) United States Patent
Satou et al.

(10) Patent No.: US 10,678,211 B2
(45) Date of Patent: Jun. 9, 2020

(54) CONTROLLER

(71) Applicant: Fanuc Corporation, Minamitsuru-gun, Yamanashi (JP)

(72) Inventors: Kazuhiro Satou, Yamanashi (JP); Kazunori Iijima, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/291,375

(22) Filed: Mar. 4, 2019

(65) Prior Publication Data

US 2019/0286099 A1   Sep. 19, 2019

(30) Foreign Application Priority Data

Mar. 19, 2018   (JP) .................................. 2018-050870

(51) Int. Cl.
  *G05B 19/4062*   (2006.01)
  *G05B 19/4065*   (2006.01)

(52) U.S. Cl.
  CPC ..... *G05B 19/4062* (2013.01); *G05B 19/4065* (2013.01); *G05B 2219/34465* (2013.01); *G05B 2219/34475* (2013.01)

(58) Field of Classification Search
  None
  See application file for complete search history.

(56) References Cited

U.S. PATENT DOCUMENTS

| 5,679,891 | A  | * | 10/1997 | Matsuno | ................. | F02B 31/06 |
|  |  |  |  |  |  | 340/439 |
| 6,291,959 | B1 | * | 9/2001 | Yoshida | ............... | G05B 19/404 |
|  |  |  |  |  |  | 318/567 |
| 2003/0004214 | A1 | * | 1/2003 | Brattsand | ............. | A61K 31/573 |
|  |  |  |  |  |  | 514/552 |
| 2006/0265116 | A1 | * | 11/2006 | Ozaki | ................. | F02D 41/1495 |
|  |  |  |  |  |  | 701/109 |
| 2007/0052383 | A1 | * | 3/2007 | Abe | .................... | G05B 19/4062 |
|  |  |  |  |  |  | 318/651 |
| 2011/0238329 | A1 | * | 9/2011 | Saarinen | ............. | G01M 13/021 |
|  |  |  |  |  |  | 702/44 |
| 2013/0006486 | A1 | * | 1/2013 | Shimizu | .................. | F16H 61/12 |
|  |  |  |  |  |  | 701/51 |
| 2014/0184114 | A1 |  | 7/2014 | Omata et al. |  |  |
| 2016/0301116 | A1 | * | 10/2016 | Ochiai | .................. | B60L 3/0046 |
| 2016/0377460 | A1 |  | 12/2016 | Song et al. |  |  |

(Continued)

FOREIGN PATENT DOCUMENTS

| CN | 104965183 A | 10/2015 |
| JP | 1311898 A | 12/1989 |
| JP | 2528654 B2 * | 8/1996 |

(Continued)

OTHER PUBLICATIONS

Notice of Reasons for Refusal for Japanese Application No. 2018-050870, dated Feb. 4, 2020, with translation, 10 pages.

*Primary Examiner* — Fekadeselassie Girma
(74) *Attorney, Agent, or Firm* — RatnerPrestia (57) ABSTRACT

A controller can switch a control system of a motor to a diagnostic operation mode in addition to a normal operation mode. Abnormality of the motor can be detected by taking advantage of the appearance of a clear difference between a feedback value detected when the motor is normal and a feedback value detected when the motor is abnormal if the control system is switched to the diagnostic mode.

6 Claims, 4 Drawing Sheets

(56) References Cited

U.S. PATENT DOCUMENTS

2019/0003362 A1\* 1/2019 Sundar ................... F01N 11/00

FOREIGN PATENT DOCUMENTS

| JP | 2003047104 | A | 2/2003 |
|----|------------|---|--------|
| JP | 2004320847 | A | 11/2004 |
| JP | 2014143896 | A | 8/2014 |
| JP | 2016111761 | A | 6/2016 |
| JP | 2017-200710 | A | 11/2017 |

\* cited by examiner

| OPERATION MODE | MOTOR CONTROL SYSTEM |
|---|---|
| MACHINING OPERATION MODE | $O(t)=K_{p1}e_1(t)+\int K_{l1}e_1(t)+\cdots$ |
| DIAGNOSTIC OPERATION MODE 1 | $O(t)=K_{p2}e_1(t)+\int K_{l2}e_1(t)+\cdots$ |
| DIAGNOSTIC OPERATION MODE 2 | $O(t)=K_{p3}e_1(t)+\int K_{l3}e_1(t)+\cdots$ |
| DIAGNOSTIC OPERATION MODE 3 | $O(t)=K_{p4}e_1(t)+\int K_{l4}e_1(t)+\cdots$ |
| ... | ... |

CONTROLLER

RELATED APPLICATIONS

The present application claims priority to Japanese Patent Application Number 2018-050870 filed Mar. 19, 2018, the disclosure of which is hereby incorporated by reference herein in its entirety.

BACKGROUND OF THE INVENTION

Field of the Invention

The present invention relates to a controller, and more particularly, to a controller configured to detect abnormality of a motor based on a speed or position feedback value of the motor.

Description of the Related Art

In detecting or predicting a failure of an industrial machine such as a machine tool or a robot, it is common to install sensors, which change their reactions depending on the state of the failure, near an object part and use detection values of the sensors. Preferably, on the other hand, the number of such sensors should be minimized in view of cost and maintenance. Accordingly, there is a demand for a method that enables detection of abnormality of the industrial machine without installing additional sensors or the like.

If a motor used in the industrial machine is focused on, for example, it is essential to detect the speed or position of the motor for the control of the motor. Therefore, speed or position sensors are normally attached to the motor so that control can be performed using position/speed feedback values from these sensors. Thus, it is highly advantageous to use the values of these sensors for abnormality detection. In the description herein, the abnormality detection includes detection of a sign of future abnormality as well as detection of the occurrence of abnormality that is problematic to objects.

For example, Japanese Patent Application Laid-Open No. 2017-200710 discloses, as a conventional technique for detecting abnormality of industrial machines by using such speed and position sensors, a technique in which abnormality of a robot is detected based on an error in the cycle time required for the tip position of the robot to reach a target position. According to this technique, such an operation that the occurrence of abnormality can easily be detected (i.e., operation of a high "required accuracy" as an operation evaluation parameter) is selected as a diagnostic operation, in order to facilitate the detection of the robot abnormality.

In general, a properly controlled motor is controlled so that even if some abnormality is generated in a component part of the motor or of an industrial machine related to the operation of the motor, differences in speed and position attributable to the abnormality are not expressed. Thus, even with use of the technique described in Japanese Patent Application Laid-Open No. 2017-200710, there is a problem that the error in the cycle time for the case in which abnormality relative to the normal state is caused or is about to occur is not likely to be a large value as long as the motor is properly controlled, so that the abnormality cannot be detected in many cases.

SUMMARY OF THE INVENTION

Accordingly, the object of the present invention is to provide a controller that facilitates detection of a properly controlled motor.

According to the present invention, in a controller for controlling a motor, the above-described problem is solved by improving the sensitivity of abnormality detection by a speed or position feedback from the motor by changing motor control parameters so as to increase the change of the motor operation due to a disturbance during a diagnostic operation for detecting abnormality of the motor.

A controller according to one form of the present invention, which is equipped with a detector for detecting a speed or position feedback value and has a function of detecting abnormality of a motor, comprises a motor control unit configured to control the motor, an operation mode switching unit configured to switch operation modes of the motor, and a motor control system changing unit configured to change a motor control system used when the motor control unit controls the motor for each of operation modes of the motor. The operation modes include at least a normal operation mode as a regular operation mode and a diagnostic operation mode in which abnormality of the motor is detected, and the motor control system changing unit changes a motor control system used when the motor control unit in the diagnostic operation mode controls the motor to a motor control system in which an operation of the motor is easily affected by a disturbance.

The motor control system changing unit may set at least one gain of the motor control system, in the diagnostic operation mode, to a value different from that for the normal operation mode.

The motor control system changing unit may insert a filter configured to amplify only a specific frequency band into the motor control system in the diagnostic operation mode.

The motor control system changing unit may stop a control output to the motor in the diagnostic operation mode, at a predetermined moment when the speed of the motor is fixed.

The controller may further comprise an abnormality detection unit configured to detect abnormality of the motor based on a feedback value detected by the detector in the diagnostic operation mode.

An abnormality detection method according to another form of the present invention, which is a method for detecting abnormality of a motor equipped with a detector for detecting a speed or position feedback value, comprises a step of changing a motor control system for controlling the motor so as to facilitate an operation of the motor to be affected by a disturbance in detecting the motor abnormality, a step of causing the motor to perform a diagnostic operation, and a step of detecting the motor abnormality based on the feedback value acquired during the diagnostic operation.

According to the present invention, abnormality generated in a motor can be accurately detected by sensors normally attached to the motor, so that abnormality of an industrial machine can be detected without the addition of unnecessary sensors, and therefore, the introduction and maintenance costs can be reduced.

DETAILED DESCRIPTION OF THE PREFERRED EMBODIMENTS

Figure 1:
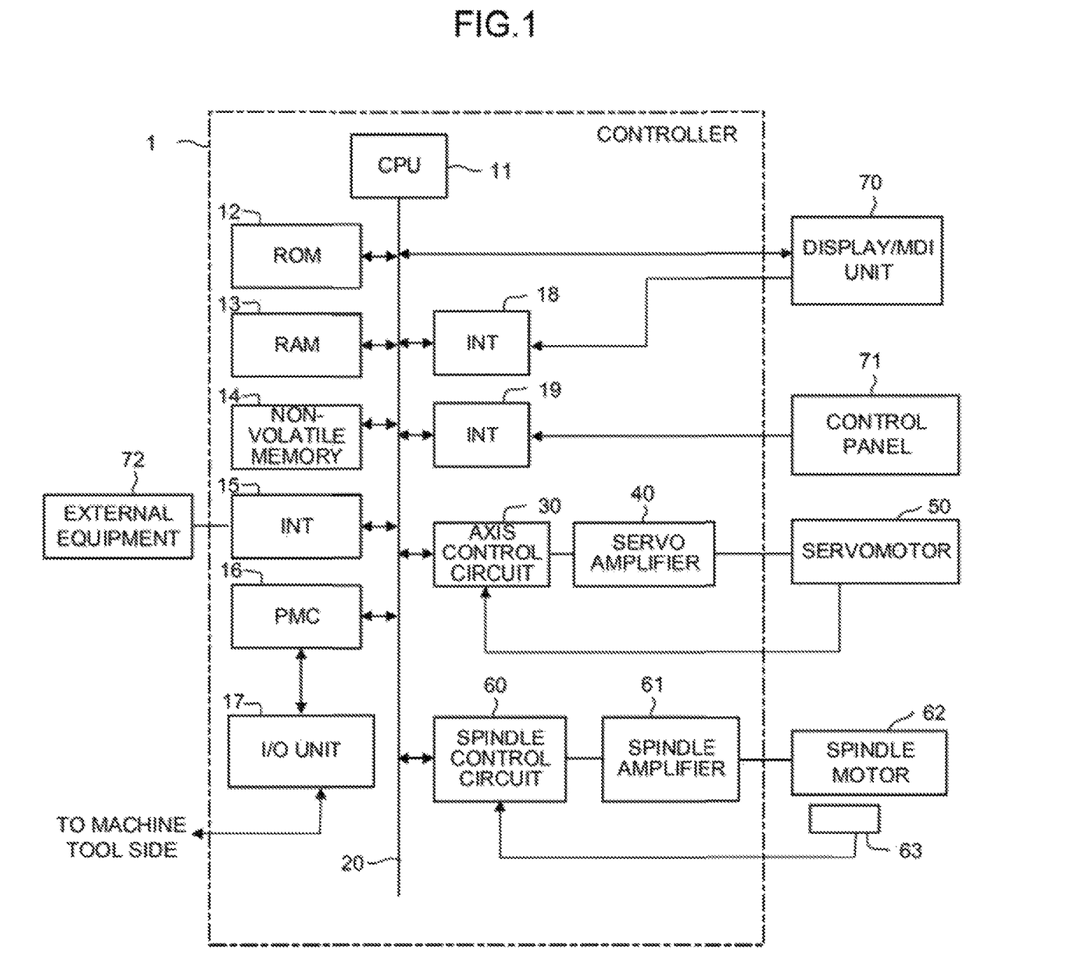
FIG. 1 is a schematic hardware configuration diagram of a controller according to a first embodiment.

FIG. 1 is a schematic hardware configuration diagram showing principal parts of a controller according to one embodiment of the present invention.

A controller 1 can be implemented as a controller for controlling an industrial machine such as a robot or a machine tool or mounted on a motor controller specialized for motor control, a servo amplifier, or the like. Moreover, the controller 1 can also be mounted on a computer, such as a cell computer or a host computer, directly connected to or indirectly connected to the controller for controlling the industrial machine or the motor controller for controlling the motor, via a wired or wireless network. The controller 1 of the present embodiment is an implementation example illustrated as the controller for controlling the machine tool.

A CPU 11 of the controller 1 according to the present embodiment is a processor for generally controlling the controller 1. The CPU 11 reads out a system program in a ROM 12 via a bus 20 and controls the entire controller 1 according to this system program. A RAM 13 is temporarily stored with temporary calculation data and display data, various data input by an operator through an input unit (not shown), and the like.

A non-volatile memory 14 is constructed as a memory that is, for example, backed up by a battery (not shown) so that its storage state can be maintained even when the controller 1 is powered off. The non-volatile memory 14 is stored with machining programs read in from external equipment 72 through an interface 15 and input through a display/MDI unit 70 and various data (e.g., various signals indicative of the execution states of commands from the machining programs and the operating state of the machine tool, and control parameters, positions, speeds, current and voltage values, and the like of a servomotor 50 and a spindle motor 62) acquired from various parts of the controller 1, the machine tool, sensors, and the like. The machining programs and the various data stored in the non-volatile memory 14 may be developed in the RAM 13 during execution and use. Moreover, various system programs such as conventional analysis programs are previously written in the ROM 12.

The interface 15 is an interface for connecting the controller 1 and the external equipment 72, e.g., an adapter. Programs, various parameters, and the like are read in from the side of the external equipment 72. Moreover, the programs, the various parameters, and the like edited in the controller 1 can be stored into an external storage unit through the external equipment 72. A programmable machine controller (PMC) 16 controls the machine tool and its peripheral devices (e.g., an actuator such as a robot hand for tool change and sensors installed on the machine tool) by outputting signals to them through an I/O unit 17 according to a sequence program incorporated in the controller 1. Furthermore, on receiving signals from various switches on a control panel on the main body of the machine tool and the peripheral devices, the PMC 16 processes these signals as required and then delivers them to the CPU 11.

The display/MDI unit 70 is a manual data input device equipped with a display, keyboard, and the like. An interface 18 receives commands and data from the keyboard of the display/MDI unit 70 and delivers them to the CPU 11. An interface 19 is connected to a control panel 71 equipped with a manual pulse generator and the like used to manually drive axes.

An axis control circuit 30 for controlling the axes of the machine tool receives a movement command of each axis from the CPU 11 and outputs a command for the axis to a servo amplifier 40. On receiving this command, the servo amplifier 40 drives a servomotor 50 for moving the axes of the machine tool. The servomotor 50 for the axes has a position/speed detector built-in and feeds back a position/speed feedback signal from this position/speed detector to the axis control circuit 30, thereby performing position/speed feedback control. In the hardware configuration diagram of FIG. 1, the axis control circuit 30, servo amplifier 40, and servomotor 50 are each shown as being only one in number. Actually, however, these elements are provided corresponding in number to the axes of the machine tool to be controlled.

A spindle control circuit 60 receives a spindle rotation command and outputs a spindle speed signal to a spindle amplifier 61. On receiving this spindle speed signal, the spindle amplifier 61 rotates a spindle motor 62 of the machine tool at a commanded rotational speed, thereby driving a tool. A position coder 63 is connected to the spindle motor 62. The position coder 63 outputs feedback pulses in synchronization with the rotation of a spindle and the feedback pulses are read by the CPU 11. The feedback pulses are used to specify the rotational speed and position of the spindle.

Figure 2:
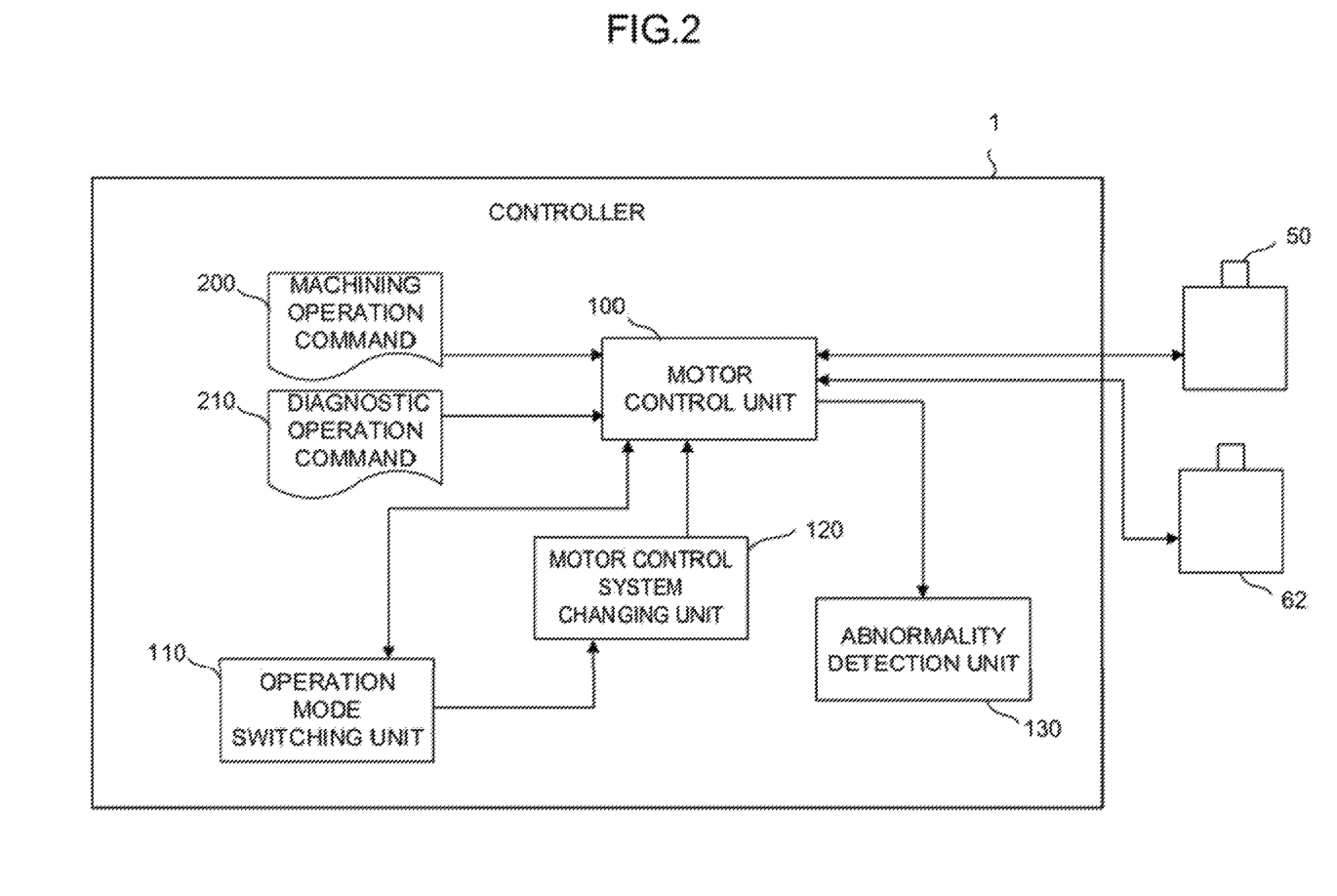
FIG. 2 is a schematic functional block diagram of the controller according to the first embodiment.

FIG. 2 is a schematic functional block diagram of the controller 1 according to one embodiment.

Functional blocks shown in FIG. 2 are implemented as the CPU 11 of the controller 1 shown in FIG. 1 executes their respective system programs and controls operations of various parts of the controller 1.

The controller 1 of the present embodiment comprises a motor control unit 100, operation mode switching unit 110, motor control system changing unit 120, and abnormality detection unit 130. The motor control unit 100 controls the servomotor 50 based on a machining operation command 200 or a diagnostic operation command 210. The operation mode switching unit 110 makes switching between normal machining control and diagnostic control. The motor control system changing unit 120 changes control parameters of a motor control system. The abnormality detection unit 130 detects abnormality of the motor based on a speed or position feedback value fed back to the motor control unit 100.

The motor control unit 100 controls the servomotor 50 and the spindle motor 62 based on the machining operation command 200 from the machining programs stored in the non-volatile memory 14 (or the machining programs developed in the RAM 13, MDI programs input from the display/MDI unit 70, or the like). Moreover, the motor control unit 100 switches the operation for the motor control from a normal operation mode to a diagnostic operation mode, based on a command from the operation mode switching unit 110, and controls the servomotor 50 and the spindle motor 62, based on the diagnostic operation command 210 from the machining programs stored in the non-volatile memory 14 (or diagnostic programs developed in the RAM 13, MDI programs input from the display/MDI unit 70, or the like).

The operation mode switching unit 110 commands the motor control unit 100 to make switching between the normal operation mode and the diagnostic operation mode at a predetermined moment (described later). Moreover, in commanding the motor control unit 100 to switch the operation mode or at a predetermined timing after the motor control unit 100 is switched to the diagnostic operation mode, the operation mode switching unit 110 commands the motor control system changing unit 120 to individually change the setting of the motor control system to be used when the motor control unit 100 controls the servomotor 50 or the spindle motor 62.

The moment at which the operation mode switching unit 110 commands the motor control unit 100 to switch the operation mode may, for example, include:

a time when a command based on an operator's operation of the display/MDI unit 70 or the control panel 71 is issued;

a time when a time previously set in the controller 1 arrives;

a time when the execution of a machining program or a diagnostic program is ended at the startup of the controller 1; and a time when a command for switching the operation mode is issued from the machining program or the diagnostic program.

The operation mode switching unit 110 may be configured to either change only the motor control system of a motor to be diagnosed or change the control systems of other motors managed by the controller 1 as well.

The motor control system changing unit 120 changes the control parameters of the motor control system for the motor control unit 100 to control the motor. The motor control system changing unit 120 changes the motor control system to the normal motor control system (control system of the motor originally set for machining by the operator) when the motor control unit 100 is switched to the normal operation mode, and changes the system to the diagnostic control system when the motor control unit 100 is switched to the diagnostic operation mode. In changing the motor control system, the motor control system changing unit 120 performs, for example, a change of the control parameters of the motor control system, addition or removal of a filter to or from the motor control system, change of connection of the motor control system, and the like.

Figure 3:
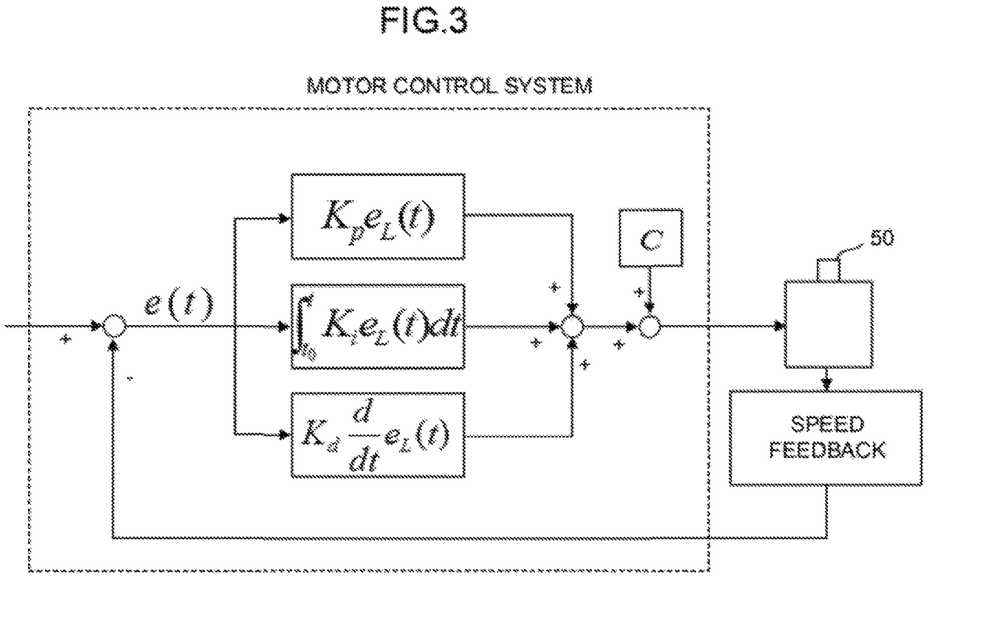
FIG. 3 is a diagram showing an example of a motor control system.

FIG. 3 shows an example of the motor control system of the servomotor 50 controlled by the motor control unit 100.

In the normal operation mode in the motor control system illustrated in FIG. 3, speed control of the servomotor 50 is performed based on control parameters $K_p$, $K_i$, $K_d$, and C, which are set so that the motor operation is stable or that the speed of the servomotor 50 attains a target speed following a disturbance even if it is urged to change by the disturbance. Therefore, even if a bearing of the servomotor 50 is rendered abnormal due to friction or the like, for example, the target speed can be maintained by the agency of the motor control system. Thereupon, when the motor control unit 100 is switched to the diagnostic operation mode, the motor control system changing unit 120 changes the control parameters $K_p$, $K_i$, and $K_d$ based on the command from the operation mode switching unit 110 and changes the control by the motor control system (specifically, reduces proportional, integral, and differential gains $K_p$, $K_i$, and $K_d$) so as to reduce the follow-up performance for the motor disturbance. In this way, if abnormality due to friction or the like is generated in the bearing of the servomotor 50 in the diagnostic operation mode, the degree of deviation from the target speed increases, so that the degree of the abnormality prominently appears in the speed feedback.

As another example of the change of the motor control system by the motor control system changing unit 120, the motor control system changing unit 120 may be configured to amplify a vibration of a specific frequency by adding a filter for amplifying the specific frequency to the motor control system (or removing a filter that attenuates the specific frequency or replacing it with a filter that passes the specific frequency) when the motor control unit 100 is switched to the diagnostic operation mode. By this change, the vibration of the specific frequency generated in the servomotor 50 prominently appears in the speed feedback, so that abnormality dependent on the specific frequency can be easily detected.

Moreover, as another example of the change of the motor control system by the motor control system changing unit 120, the motor control system changing unit 120 may also be configured to cause the servomotor 50 to perform an inertial operation, by setting the gains of the motor control system to zero (or stops the control output to the servomotor 50) by the motor control unit 100 at a predetermined timing during the diagnostic operation mode. By changing the motor control system in the aforesaid manner after the speed of the servomotor 50 is set to a predetermined speed, the servomotor 50 can be caused to perform the inertial operation to facilitate the detection of abnormality that is liable to appear in the speed feedback during natural deceleration.

The change of the motor control system by the motor control system changing unit 120 may be made in any manner, provided that it facilitates the detection of a sign of the abnormality of the servomotor 50 that appears in a speed or position feedback. For example, the change may be made for an element in or outside a control loop of the motor control system. The motor control system may be any of various other systems than that illustrated in FIG. 3, depending on the purpose of use or the industrial machine on which it is installed. The change of the motor control system by the motor control system changing unit 120 is applicable to any of these systems. While the motor control system illustrated in FIG. 3 is based on a speed control loop, for example, the change is also applicable to a motor control system based on a position control loop, a current control loop, or a combination thereof. The individual motor control systems show their respective reactions to a disturbance. However, it is necessary only that an experiment or the like be previously made to confirm the way of changing the motor control system for an appropriate degree of follow-up to a disturbance in the diagnostic operation mode so that the change of the motor control system in the diagnostic operation mode can be determined based on the result of the confirmation.

Figure 4:
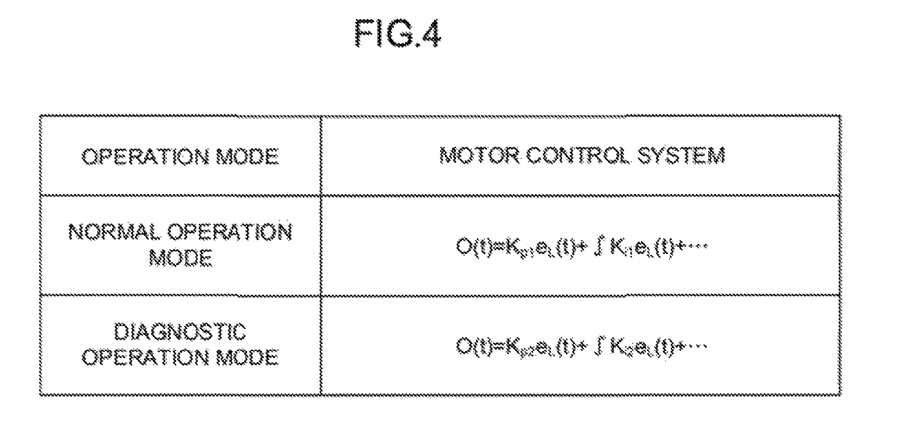
FIG. 4 is a diagram showing an example of association between operation modes and motor control systems.

The change of the motor control system for each operation mode by the motor control system changing unit 120 may also be set in advance on the non-volatile memory 14. In this case, as illustrated in FIG. 4, the motor control system may also be set in association with each operation mode in advance so that the change to the corresponding motor control system can be made with reference to the non-volatile memory 14 at the time of switching of the operation mode.

The abnormality detection unit 130 acquires from the motor control unit 100 the speed or position feedback value of the motor (servomotor 50 or spindle motor 62) to be subjected to abnormality detection and performs the abnormality detection based on the acquired speed or position feedback value. The abnormality detection unit 130 detects the abnormality of the motor by a prior art or conventional abnormality detection method. In detecting the abnormality most simply, the abnormality detection unit 130 may be configured to determine that abnormality of the motor is detected, for example, if a difference between a feedback value acquired in the diagnostic operation mode and a feedback value of the motor in normal operation that has been acquired in advance exceeds a predetermined threshold.

If the motor abnormality is expected to be more highly detected, an unsupervised learning unit is introduced as the abnormality detection unit 130, and the transition of the feedback value of the motor in normal operation is learned in the diagnostic operation mode to create a cluster in advance. In detecting the normality or abnormality of the motor, the feedback value of the motor in the diagnostic operation mode may be input to the unsupervised learning unit so that it can be determined that the abnormality of the motor is detected if the input feedback value is deviated from the cluster of the feedback value of the motor in normal operation. Moreover, in the diagnostic operation mode, the cluster obtained during the normal operation of the motor and clusters for individual failure modes (failure of a bearing, failure of a winding, distortion of axes, etc.) are created in advance. Then, in detecting the normality or abnormality of the motor, the feedback value of the motor in the diagnostic operation mode may be input to the unsupervised learning unit so that whether or not the motor is normal or the failure mode related to the occurrence of abnormality can be specified by the cluster to which the input feedback value belongs.

Furthermore, a supervised learning unit is introduced into the abnormality detection unit 130, teacher data for the case in which the motor is operating normally and teacher data for the case in which the motor is abnormal are created based on the feedback value detected in the diagnostic operation mode, and machine learning is performed based on these teacher data. Then, in detecting the normality or abnormality of the motor, the feedback value of the motor in the diagnostic operation mode may be input to the unsupervised learning unit so that determination of the normality or abnormality can be output.

Also in the case where supervised learning is used, failure mode determination can be performed by creating teacher data for the individual failure modes (failure of a bearing, failure of a winding, distortion of axes, etc.).

In the controller 1 of the present embodiment constructed in this manner, the detection of the abnormality of the motor by the abnormality detection unit 130 can be facilitated by changing the motor control system so that the motor operation is easily affected by a disturbance in the diagnostic operation mode. In the controller 1 of the present embodiment, a clear difference is easily caused between the feedback value detected when the motor is normal and that detected when the motor is abnormal in the diagnostic mode, so that the motor abnormality can be sensitively detected even if a simple structure is used for the abnormality detection unit 130. Moreover, if the machine learning device is introduced into the abnormality detection unit 130, the machine learning can be terminated with low learning data quantity, since the difference between determination outputs in normal and abnormal states is clear, so that a reduction in learning cost can be expected.

Figure 5:
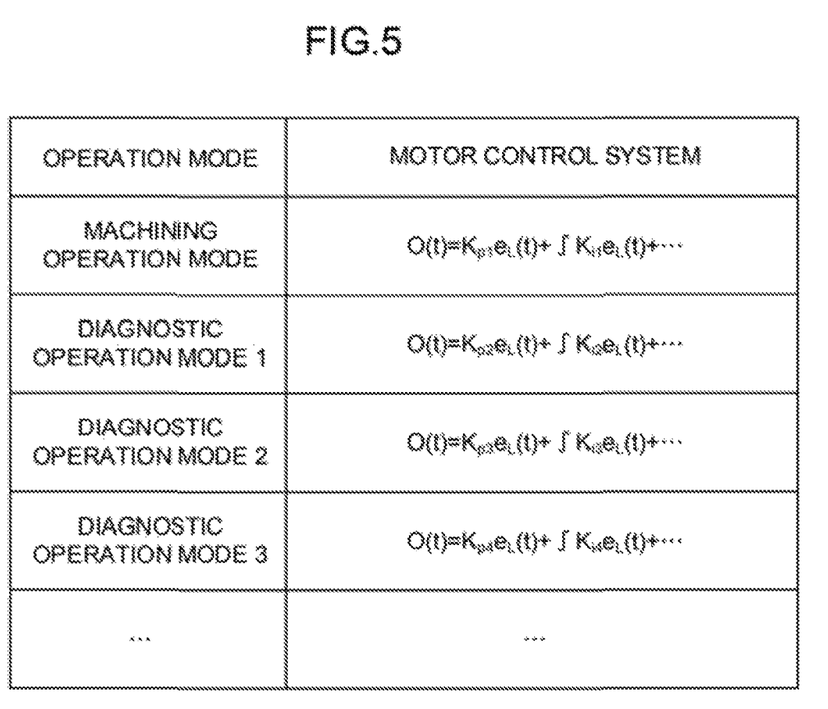
FIG. 5 is a diagram showing another example of the association between the operation modes and the motor control systems.

As a modification of the controller 1 of the present embodiment, a plurality of diagnostic operation modes may be provided for the motor control unit 100 to be switched by the operation mode switching unit 110. Abnormalities generated in the motor vary depending on their causes or failure abnormality locations, and the settings of the motor control system by which the individual abnormalities can easily be expressed in the feedback value may sometimes vary depending on each abnormality cause and abnormality location. In such a case, motor control systems for the individual diagnostic operation modes are set in advance, as illustrated in FIG. 5, after providing the diagnostic operation modes individually for the abnormality causes and the abnormality locations expected to be detected and preparing the diagnostic operation command 210 for each diagnostic operation mode. The operation mode switching unit 110 commands the motor control unit 100 to switch the normal operation mode with diagnostic operation modes 1, 2, 3 . . . at the predetermined moment. In the individual diagnostic operation modes, the motor control system changing unit 120 changes the motor control system of the motor control unit 100 to the motor control systems corresponding to the diagnostic operation modes, while the motor control unit 100 executes the diagnostic operation commands 210 to be executed in these diagnostic operation modes. In this way, abnormalities generated in the motors can be detected with high accuracy and the abnormality causes and locations can also be determined with ease.

As another modification of the controller 1 of the present embodiment, a plurality of gradually applicable diagnostic operation modes may also be provided for the motor control unit 100 to be switched by the operation mode switching unit 110. In introducing the above modification, a diagnostic operation mode in which a wider variety of abnormalities can easily be detected and a diagnostic operation mode in which more specific abnormalities can easily be detected are provided in advance. These diagnostic operation modes can be used to gradually narrow down the abnormality causes and locations of the motors in such a manner that diagnostic operations in the individual diagnostic operation modes are performed while sequentially switching the mode, starting from the diagnostic operation mode in which a wider variety of abnormalities can easily be detected.

While an embodiment of the present invention has been described herein, the invention is not limited to the above-described embodiment and may be suitably modified and embodied in various forms.

For example, in the embodiment described above, the controller 1 is illustrated as being implemented as the controller for controlling the machine tool. Alternatively, however, the controller 1 may be implemented as a motor control system or mounted on a computer such as a host computer, as described before. Moreover, a functional means can be assigned to and mounted on each of these devices. For example, the motor control unit 100, operation mode switching unit 110, and motor control system changing unit 120 described above can be properly arranged in accordance with the characteristics of a destination device and each functional means. Specifically, the abnormality detection unit 130 may be mounted on the host computer connected via a bus or a network after mounting the units 100, 110, and 120 on the motor control system. In the present invention, the operation mode switching unit 110 and the motor control system changing unit 120 have supportive roles dedicated to efficient abnormality detection, so that there is no serious problem if they are installed on any of the devices. Furthermore, when the machine learning device is introduced into the abnormality detection unit 130, the cost of the entire system can be reduced by locating the abnormality detection unit 130 on the host computer so that it can be shared by a plurality of industrial machines.

The invention claimed is:

1. A controller equipped with a detector for detecting a speed or position feedback value and having a function of detecting abnormality of a motor, the controller comprising:
   a motor control unit configured to control the motor;

an operation mode switching unit configured to switch operation modes of the motor; and a motor control system changing unit configured to change a motor control system used when the motor control unit controls the motor for each of operation modes of the motor, wherein the operation modes include at least a normal operation mode as a regular operation mode and a diagnostic operation mode in which abnormality of the motor is detected, and the motor control system changing unit changes a motor control system used when the motor control unit in the diagnostic operation mode controls the motor to a motor control system to increase an effect of a disturbance on the speed or position feedback value.

2. The controller according to claim 1, wherein the motor control system changing unit sets at least one gain of the motor control system, in the diagnostic operation mode, to a value different from that for the normal operation mode.

3. The controller according to claim 1, wherein the motor control system changing unit inserts a filter configured to amplify only a specific frequency band into the motor control system in the diagnostic operation mode.

4. The controller according to claim 1, wherein the motor control system changing unit stops a control output to the motor in the diagnostic operation mode, at a predetermined moment when the speed of the motor is fixed.

5. The controller according to claim 1, further comprising an abnormality detection unit configured to detect abnormality of the motor based on a feedback value detected by the detector in the diagnostic operation mode.

6. An abnormality detection method for detecting abnormality of a motor equipped with a detector for detecting a speed or position feedback value, the abnormality detection method comprising:

a step of changing a motor control system for controlling the motor to increase an effect of a disturbance on the speed or position feedback value;

a step of causing the motor to perform a diagnostic operation; and a step of detecting the motor abnormality based on the feedback value acquired during the diagnostic operation.

* * * * *